March 18, 1952  C. J. PAUL  2,589,625
CORN ROASTER

Filed Sept. 24, 1948  2 SHEETS—SHEET 1

INVENTOR.
Clifton J. Paul
BY
ATTYS

March 18, 1952  C. J. PAUL  2,589,625
CORN ROASTER

Filed Sept. 24, 1948  2 SHEETS—SHEET 2

INVENTOR:
Clifton J. Paul
BY
ATTYS

UNITED STATES PATENT OFFICE 2,589,625

CORN ROASTER

Clifton J. Paul, Del Paso Heights, Calif.

Application September 24, 1948, Serial No. 50,938

4 Claims. (Cl. 99—421)

This invention is directed to, and it is an object to provide, a novel food roaster of exposed or barbecue type, the roaster being especially designed for roasting ears of corn.

Another object of the invention is to provide a food roaster, as above, wherein individual pieces of food, such as corn, are supported by power driven spits or prongs above a cooking unit, here an electric grid.

A further object of the invention is to provide a novel drive mechanism for the food supporting prongs.

An additional object of the invention is to provide a food roaster, of the type described, wherein the food supporting prongs are mounted —in novel manner—for swinging motion between a lowered cooking position and a raised position for placement or removal of food thereon.

It is also an object of the invention to provide a food roaster which is designed for ease and economy of manufacture; the structure being simple, and requiring a minimum of maintenance or repair.

A further object of the invention is to provide a practical, reliable, and convenient food roaster.

These objects are accomplished by means of such structure and relative arrangement of parts as will fully appear by a perusal of the following specification and claims.

Figure 1:
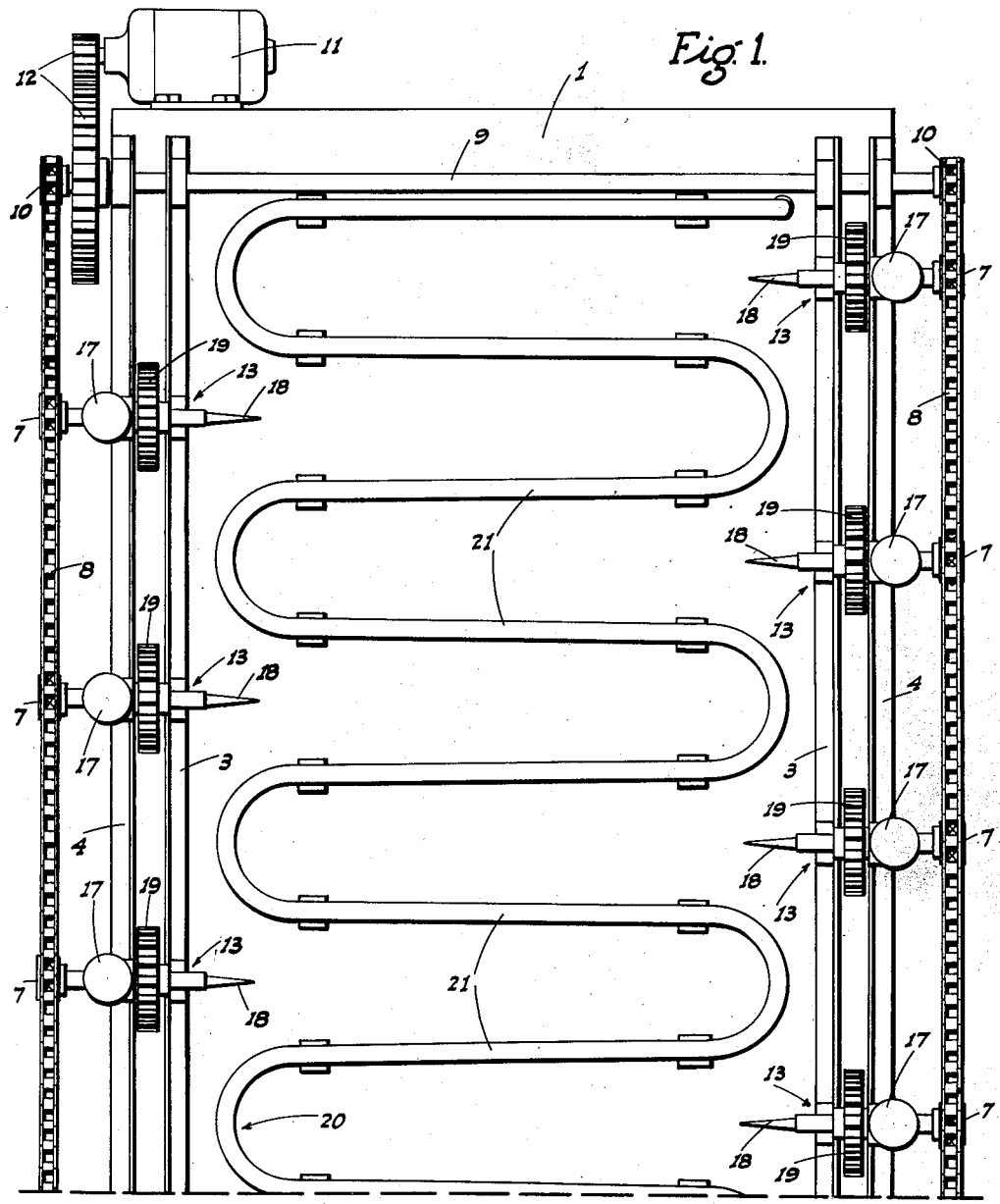
Fig. 1 is a fragmentary plan view of the device.
Figure 2:
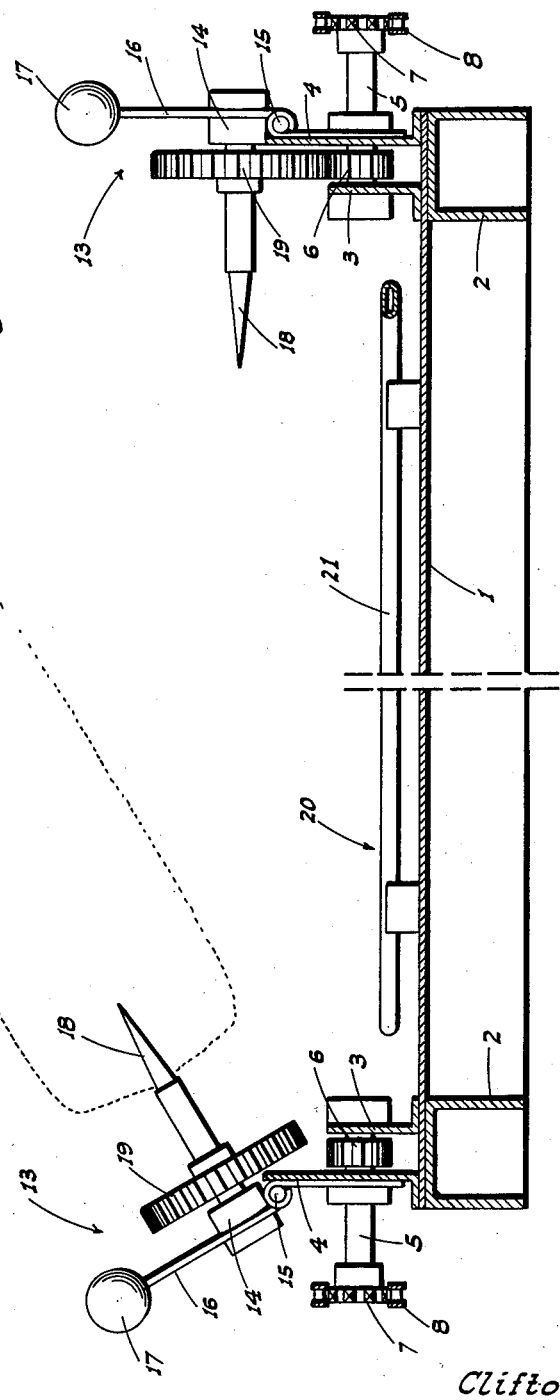
Fig. 2 is a cross section of the device showing one food supporting prong unit in lowered working position, and another in raised position for placement or removal of food.

Referring now more particularly to the characters of reference on the drawings, the food roaster comprises a horizontal base plate 1 which is rectangular but elongated in plan; such base plate 1 being supported from below and about the edges by a rectangular base 2.

Along each longitudinal edge thereof the base plate 1 is fitted with a pair of upstanding, longitudinal flanges, indicated at 3 and 4; the outer flanges 4 being of greater height than the inner flanges 3.

At spaced points in the length thereof each pair of flanges 3 and 4 is fitted with stub shafts 5 journaled with, and extending between, said flanges; each such stub shaft 5 carrying a pinion 6 thereon between the flanges. The stub shafts 5 project outwardly of the corresponding flange 4, and carry sprockets 7 driven by an endless chain 8 which extends lengthwise of the device in a generally horizontal plane.

At one end of the base plate 1 the flanges 3 and 4 support a cross shaft 9 in journaled relation, and such cross shaft carries sprockets 10 which drive the endless chains 8. The cross shaft 9 is driven at reduced speed from an electric motor 11 by means of a reduction gear train 12. The motor 11 is adapted to be controlled through the medium of an electric circuit (not shown).

Above each stub shaft 5 there is a food supporting prong unit, indicated generally at 13, mounted in connection with the corresponding outer flange 4, and comprising the following structural arrangement:

Each food supporting prong unit 13 comprises a bearing block 14 hinged, as at 15, to the outside of the corresponding flange 4 for swinging motion between one position resting on the upper edge of said flange as a stop, and another position rocked outwardly and downwardly therefrom.

The bearing block 14 includes an upstanding handle 16 fitted, at its upper end, with a hand knob 17, for ease of manipulation of the bearing block 14.

A rotary prong, indicated at 18, is journaled in connection with the bearing block 14 and projects inwardly therefrom; such prong being horizontal and overhanging the base plate 1 inwardly of the adjacent flange 3, when the bearing block 14 is in its stop position in abutment with the upper edge of the flange 4.

Each rotary prong 18 is fitted with a gear 19 which meshes with the corresponding pinion 6 when the prong 18 is in its lowered horizontal or cooking position, but is free of said pinion when the block 14 is rocked outwardly and downwardly to incline the prong for the placement or removal of food. This is an important feature because it stops the rotation of the prong 18 for said placement or removal of the food.

The food supporting prong units 13 on the opposite sides of the device are in staggered relation so as to assure against the food on one prong from interfering with the food on the opposed corresponding prong.

The base plate 1 is fitted, between the flanges 3, with a zig-zag electric cooking unit, indicated generally at 20, which includes a plurality of transverse legs 21 in spaced apart relation lengthwise of the device. The cooking unit 20 is of the tubular, enclosed resistance type, such as a "Calrod" unit. The electric circuit for the cooking unit 20 is omitted for the purpose of clarity, but may be of any suitable type, including switching means for high, medium, or low heat.

When the above described food roaster is in use, pieces of food, such as ears of corn, are impaled on the rotary prongs 18, with the latter in their upwardly inclined non-rotary position. After the food is in place, the knobs 17 on the handle 16 are manipulated to swing the prong units 13 downwardly to their cooking position, at which time the gears 19 fall in mesh with the pinions 6, resulting in continuous turning of the food above the electric cooking unit 20, as is desirable.

The described food roaster provides a very handy and practical device for the effective and tasty cooking of foods; the structure being relatively light-weight so that it is capable of being moved from place to place as desired. Also, the device is neat in appearance and can thus be used as an exposed or barbecue type of cooker.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A food roaster comprising a base, a cooking unit on the base, a rotary prong normally overhanging the cooking unit from one side, a journal in which the prong is supported, means mounting the journal for motion to tilt the prong to an upwardly inclined position, a gear on the prong, and a driven pinion mounted to mesh with the gear only when the prong is in normal position.

2. A food roaster comprising a base, a cooking unit on the base, a rotary prong normally overhanging the cooking unit from one side, a journal in which the prong is supported, means mounting the journal for motion to tilt the prong to an upwardly inclined position, a gear on the prong, and a driven pinion mounted to mesh with the gear only when the prong is in normal position; there being a handle upstanding from the journal.

3. A food roaster comprising a base, a cooking unit on the base, a rotary prong normally overhanging the cooking unit from one side, a bearing block in which the outer end portion of the prong is journaled, a flange upstanding from the base, a hinge securing the block to the flange for outward and downward rocking motion from a normal position resting in stop relation against the upper edge of the flange, a handle upstanding from the block, and means to drive the prong; said last named means comprising a driven shaft below the prong, a gear on the prong, and a pinion on the shaft, the gear and pinion meshing only when the prong is in normal position.

4. A food roaster comprising a base, a cooking unit on the base, said cooking unit being relatively flat and horizontally disposed, a longitudinal row of spaced, food supporting prong units on each side of the cooking unit, each unit including a rotary prong normally projecting inwardly generally horizontally to support food over said unit, the cooking unit comprising a continuous electric resistance element lying in a horizontal plane of generally zig-zag form and including spaced transverse legs adjacent pairs of which are connected to each other at one end only while the adjacent legs of such pairs are connected at the other end only; the prongs of one row being disposed between the vertical planes of the pairs of legs and projecting laterally toward the connected end thereof and the prongs of the other row being similarly disposed relative to said adjacent legs.

CLIFTON J. PAUL.

REFERENCES CITED

The following references are of record in the file of this patent:

UNITED STATES PATENTS

| Number | Name | Date |
| --- | --- | --- |
| 1,520,498 | Jenks et al. | Dec. 23, 1924 |
| 1,588,530 | Currier et al. | June 15, 1926 |
| 1,723,145 | Fernald | Aug. 6, 1929 |
| 1,782,639 | Van Allen | Nov. 25, 1930 |
| 1,809,172 | Le Sauvage | June 9, 1931 |
| 2,012,811 | Duffy | Aug. 27, 1935 |
| 2,130,259 | Bonaguidi | Sept. 13, 1938 |
| 2,245,220 | Nelson | June 10, 1941 |
| 2,306,519 | Bobo | Dec. 29, 1942 |
| 2,388,831 | Cramer | Nov. 13, 1945 |
| 2,470,645 | Reichart | May 17, 1949 |
| 2,485,890 | Keljik | Oct. 25, 1949 |
| 2,486,345 | Triulzi | Oct. 25, 1949 |
| 2,494,448 | Nassif | Jan. 10, 1950 |
| 2,536,630 | Elmer | Jan. 2, 1951 |
| 2,556,740 | Polsen et al. | June 12, 1951 |

FOREIGN PATENTS

| Number | Country | Date |
| --- | --- | --- |
| 276,053 | Great Britain | Aug. 15, 1927 |